United States Patent [19]
Cunanan

[11] Patent Number: 6,046,850
[45] Date of Patent: Apr. 4, 2000

[54] STEREOSCOPE APPARATUS

[76] Inventor: Candido C. Cunanan, 94-1050 Eleu St., Waipahu, Hi. 96797

[21] Appl. No.: 08/610,397
[22] Filed: Mar. 4, 1996
[30] Foreign Application Priority Data Dec. 8, 1995 [PH] Philippines ................. 51869

[51] Int. Cl.⁷ .................................. G02B 27/24
[52] U.S. Cl. ........................................ 359/472
[58] Field of Search .................. 434/365; 359/462, 359/466, 471, 472, 474, 475, 477

[56] References Cited

U.S. PATENT DOCUMENTS

| | | | |
|---|---|---|---|
| 1,373,847 | 4/1921 | White | 359/475 X |
| 1,579,025 | 3/1926 | Owens | 359/471 |
| 4,623,223 | 11/1986 | Kempf | 359/472 |
| 5,126,878 | 6/1992 | Trumbuil et al. | 359/472 |
| 5,559,632 | 9/1996 | Lawrence et al. | 359/462 X |
| 5,588,914 | 12/1996 | Adamczyk | 463/32 |

Primary Examiner—William H. Grieb

[57] ABSTRACT

Disclosed is a stereoscope apparatus comprising a left and right reflective sheets converging, in upright position at a predetermined angle in the range of 40 to 50 degrees, towards the line of sight of the viewer so that the left eye sees only the left reflective sheet and the right eye sees only the right reflective sheet. A pair of holding means for the pictures or images are disposed relative to the reflective sheets at angle of 40 to 50 degrees whereby the pictures or images held therein are simultaneously reflected to the respective left and right reflective sheets. The pictures or images are the corresponding left and right eye views of the pictures or images intended to be viewed. When viewed, the reflective sheets acting as the screen, imparts a three dimensional effect upon the eyes of the viewer. Enclosing walls, forming a box-type structure confine the reflective sheets and the holding means. On the sides of the holding means are compartments to contain a plurality of the left eye views and the rights eye views of the pictures or images queued up for viewing.

14 Claims, 11 Drawing Sheets

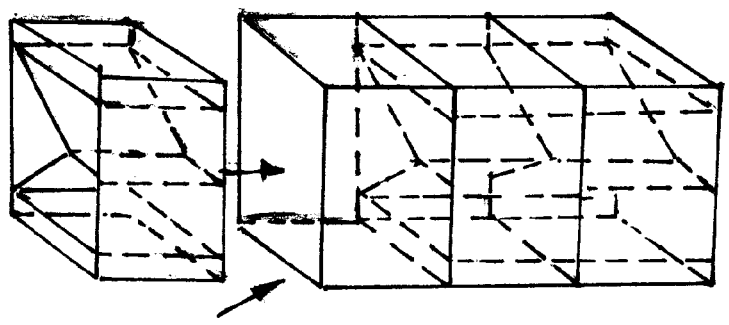
FIG.5B
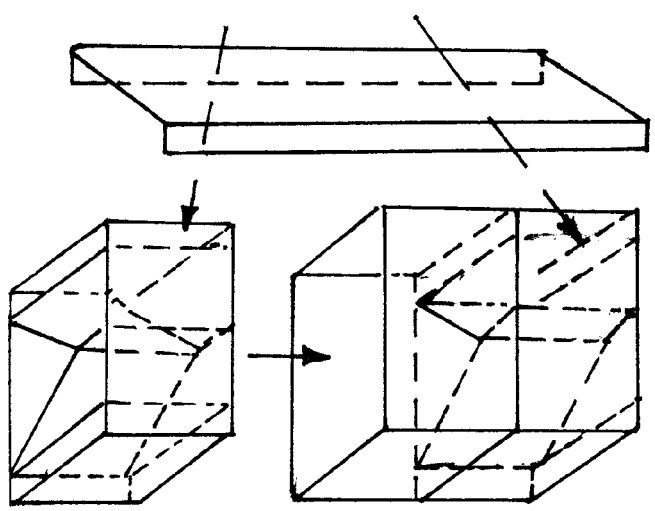
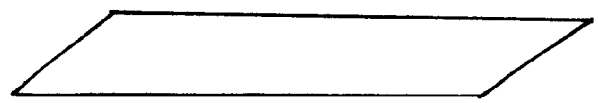
FIG.5A

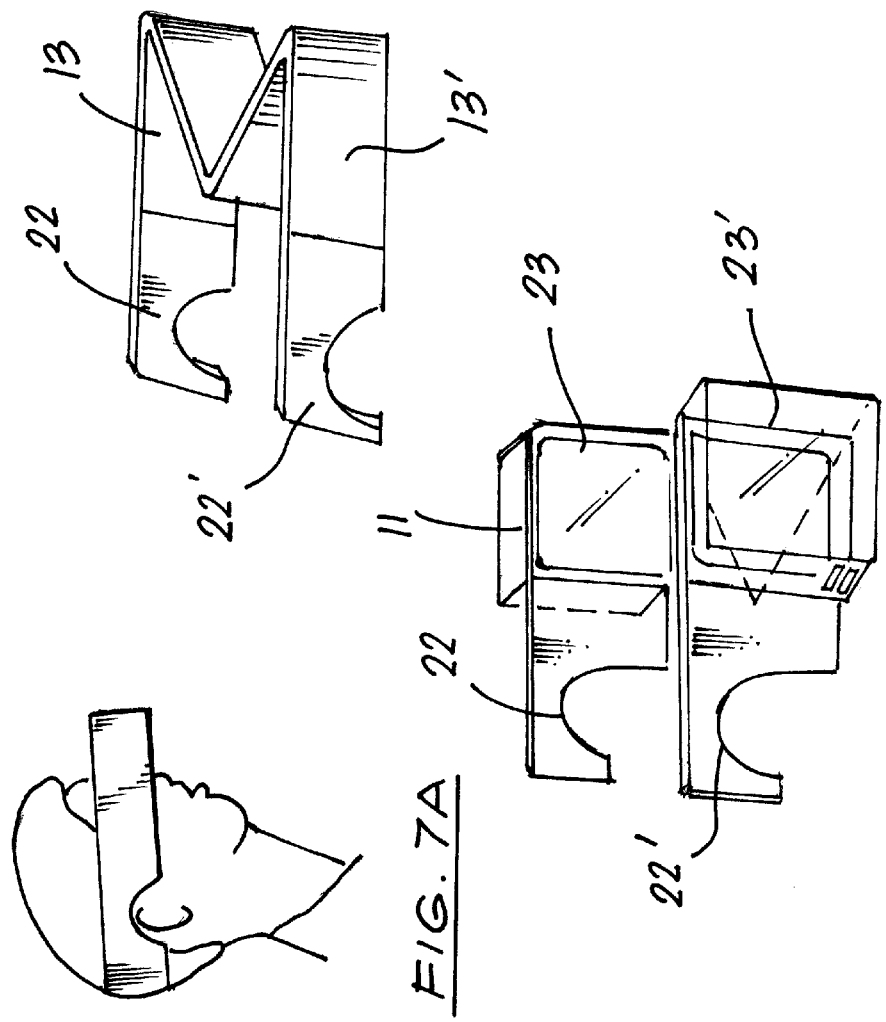

STEREOSCOPE APPARATUS

FIELD OF INVENTION

The present invention relates in general to optics and visual devices, and more particularly to an improved stereoscope apparatus for use in the field of entertainment, amusement, advertising, education, and training and the like.

BACKGROUND OF THE INVENTION

Visual devices for creating three dimensional (3D) effect on pictures, images, or graphical representations are known. The most common is a hand-held device known as the "VIEWMASTER" where still pictures are viewed in 3D through a pair of lenses installed in the device. One drawback of this "VIEWMASTER" is that it cannot be used for viewing big or life-size pictures, and therefore has very limited application.

Other common 3D devices/products are the 3D greeting cards, credit cards, and motion pictures. In the case of 3D cards, a special arrangement of lenses are used to create 3D effect while in case of motion pictures, special spectacles or eyewear are used by the viewer in order to appreciate the 3D effect of the pictures projected on the screen. All these require sophisticated and complicated process and apparatus in order to create 3D effect.

SUMMARY AND OBJECTS OF THE INVENTION

The present invention is an stereoscope apparatus for transforming two (2) dimensional pictures or images into three (3) dimensional ones or 3D. This device basically includes at least two (2) reflective sheets or surfaces namely the left and the right reflective sheets of surfaces converging at a predetermined angle in upright position relative to the line of sight of the viewer such that the left eye sees only the left reflective sheet or surface; and a holding means for pictures or images disposed at a predetermined angle relative to the reflective sheets or surfaces whereby the pictures or images held therein namely, the left eye view and the right eye view of a picture or image are reflected on the reflective sheets or surfaces thereby imparting a three (3) dimensional effect on the eyes of the viewer.

The primary object of this invention is to provide an improved stereoscope apparatus that is simple in construction yet effective in creating 3D effect on pictures or images, whether still or moving. Thus, this stereoscope apparatus will find excellent application in the field of amusement, entertainment, education and training as well as in advertising.

Another object of this invention is to provide a stereoscope apparatus which can come in various sizes such as eye-glass size, hand-held size, table top size, telephone booth size, wall size, giant wall size, or the theatre size or giant theatre size.

Still another object of this invention is to provide a stereoscope apparatus which has no color limitation. The pictures or images reflected therein can be of various colors depending on the original colors of the pictures or images for viewing.

A further object of this invention is to provide a stereoscope apparatus which is efficient and reliable to use, and guaranteed to last for a long period of time as it has no complicated moving parts which will easily wear out.

BRIEF DESCRIPTION OF THE DRAWINGS

The above objects and advantages will become apparent upon reading the following detailed description taken in conjunction with the accompanying drawings wherein:

FIGS. 5A and 5B are perspective views respectively of the two-tiered and a three-tiered models of the subject invention;

FIG. 7A is an illustration of the eyeglass size model;

FIG. 7B is an illustration of the eyeglass sizer model with small televisions;

DETAILED DESCRIPTION

Figure 1:
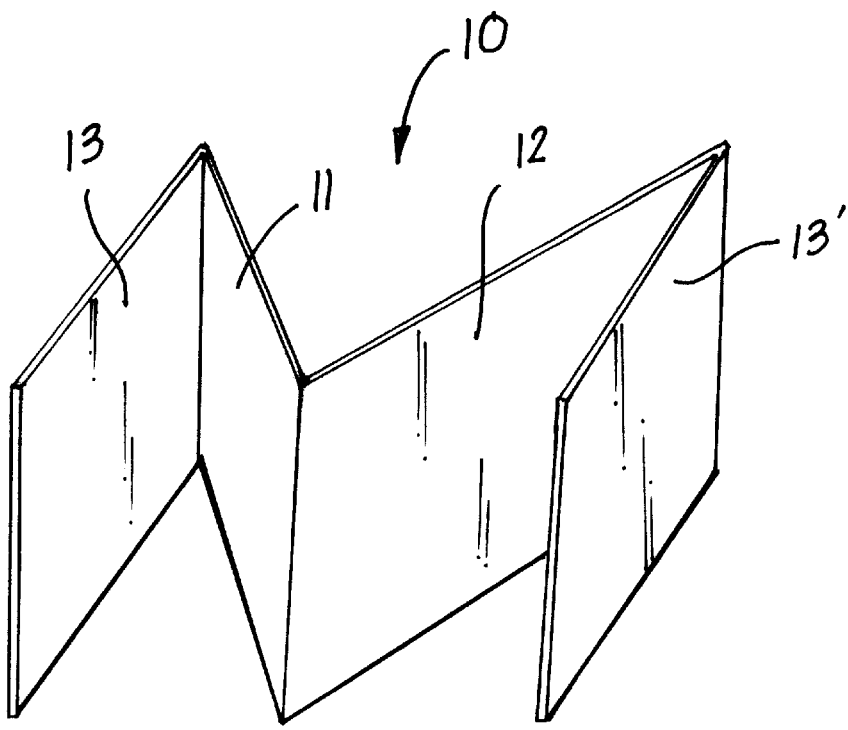
FIG. 1 is a perspective view of the basic embodiment of this stereoscopic apparatus showing the essential elements.

With reference to the different views of the drawings in detail, there is shown the basic embodiment of the subject stereoscope apparatus generally indicated as 10 comprising at least two (2) reflective sheets namely the left reflective sheet 11 and the right reflective sheet 12 converging at a predetermined angle in upright position relative to the line of sight of the viewer such that the left eye sees only the left reflective sheet and the right eye sees only the right reflective sheet.

This stereoscope apparatus 10 also includes a holding means 13 and 13' for pictures or images disposed at a predetermined angle relative to the reflective sheets 11 and 12 whereby the pictures or images held therein namely, the left eye view and the right eye view of a particular picture on image are reflected on the respective reflective sheets 11 and 12 thereby imparting three (3) dimensional effect on the eyes of the viewer.

The reflective sheets 11 and 12 may have flat, convex or concave surfaces and are preferably made of mirrors but other materials capable of reflecting pictures or images may be used. These materials may include plastic sheets coated with reflective coating, reflectorized glasses, metals, composite materials and other mirror-like reflective sheets or surfaces.

Figure 2:
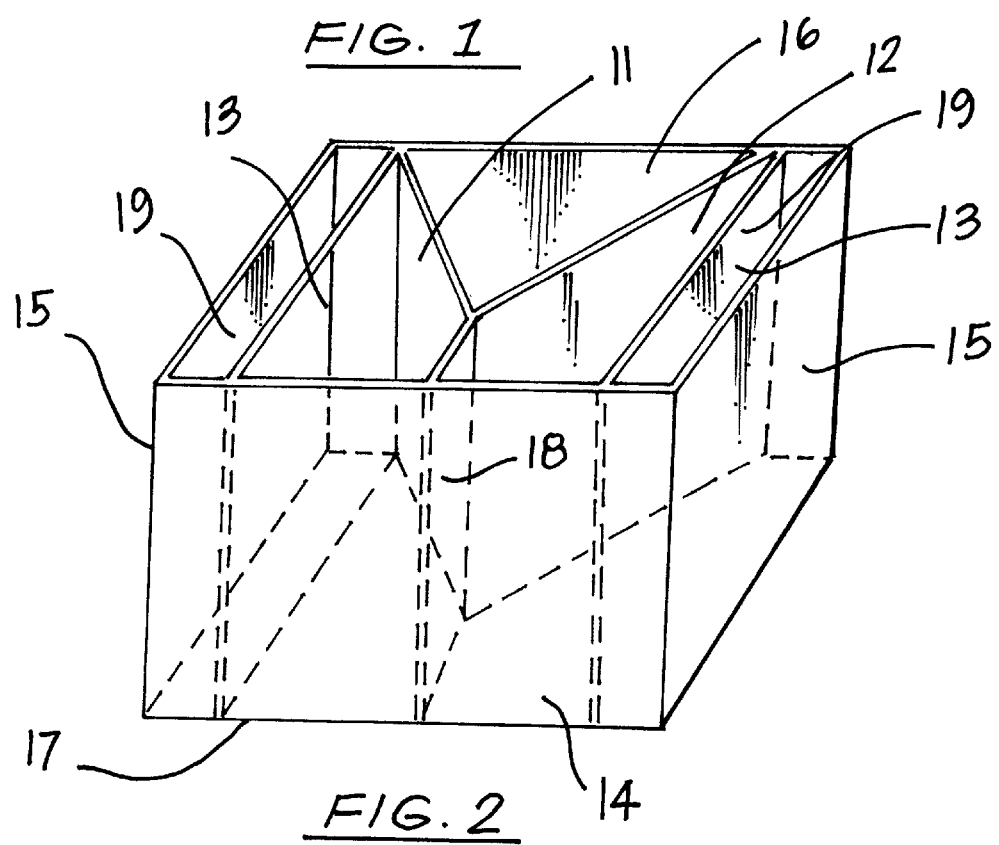
FIG. 2 is a perspective view of an embodiment of this invention provided with enclosing walls.

Shown in FIG. 2 is another embodiment of the subject stereoscope apparatus with enclosing walls. In addition to the basic elements namely, reflective sheets 11 and 12, and holding means 13 and 13', this embodiment includes enclosing walls namely, front wall 14, side walls 15 and 15', rear wall 16, and bottom wall 17. Also, a divider wall 18 extends from the converging point of the reflective sheets 11 and 12. This divider wall 18 ensures that the left eye sees only the left eye view of the picture reflected on the left reflective sheet and the right eye sees only the right eye view of the picture reflected on the right reflected sheet 12.

Further in FIG. 2, there is shown two (2) compartments on the sides, namely the left compartment 19 and the right compartment 19'. These compartments are adapted to contain separately the left and right eye views of the pictures or images to be viewed.

The enclosing walls are preferably clear glass or plastics but other materials suited for the purpose may also be used. If opaque enclosing walls are used, viewing holes or lenses may be provided on the front wall. The viewing lenses may be ordinary lenses but may also be special lenses with magnifying capability.

Figure 3B:
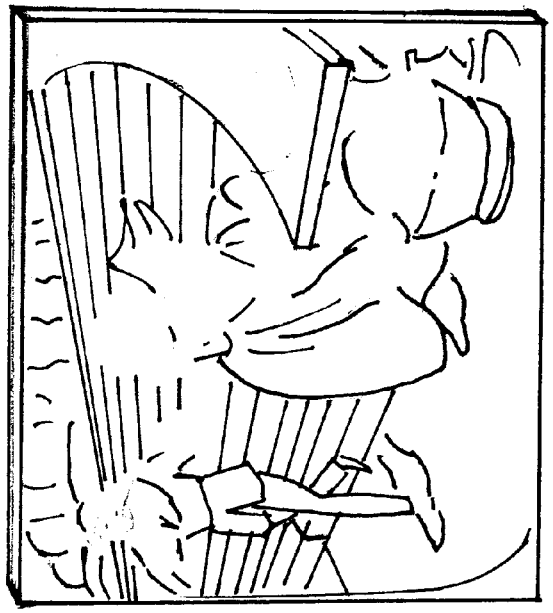
FIGS. 3A and 3B are plan views of the left eye view and the right eye view of a sample picture to be reflected to the reflective surfaces of this stereoscope apparatus.
Figure 3A:
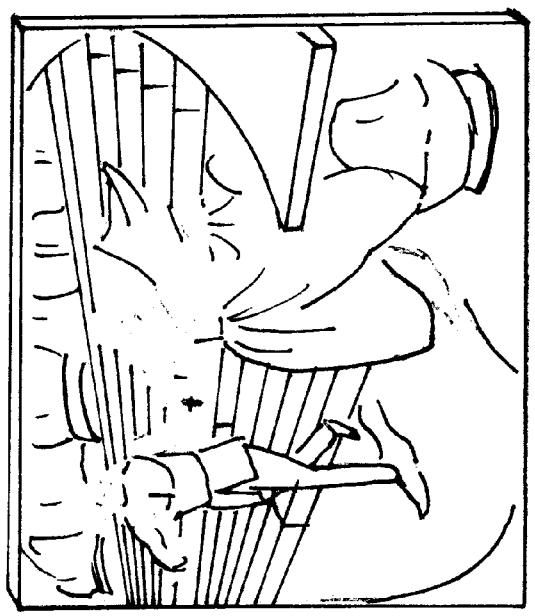

Shown in FIG. 3A and 3B are left and right eye views respectively of a particular picture or scene. To produce these views, a camera is used to take the left eye view of the picture, and thereafter take the right eye view thereof. The left eye view is taken by closing the right eye, and focusing the camera with the left eye, and then snapping a shot. For the right eye view, the left eye is closed, and the right eye is used in focusing the camera, and likewise snapping the shot.

These views are then placed on the holding means 13 and 13' ensuring that the left eye view picture is placed on the left holding means 13 and the right eye view picture is placed on the right holding means 13'.

Figure 4:
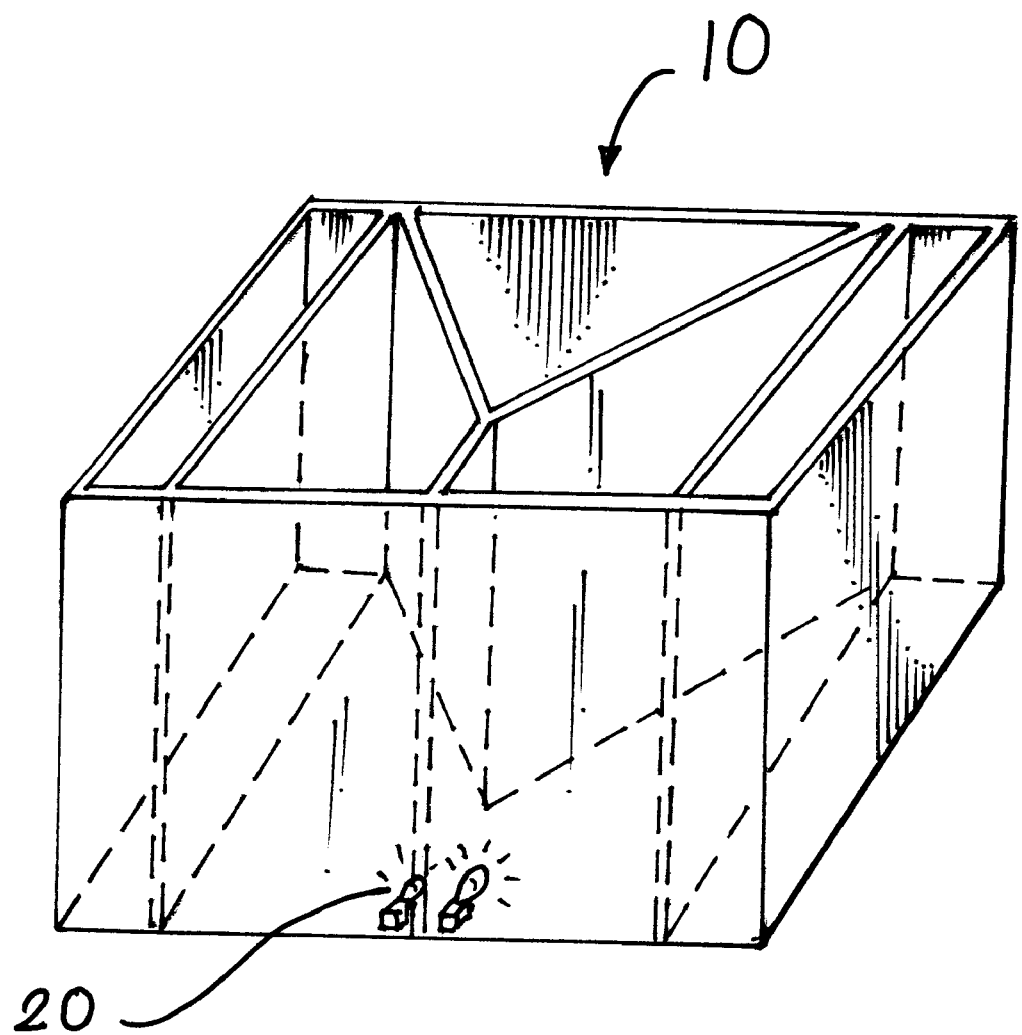
FIG. 4 is a perspective view of another embodiment of the subject stereoscope apparatus with lighting device.

In FIG. 4 is shown a stereoscope apparatus 10 similar to the one shown in FIG. 2 but this time it uses a lighting device 20 for clear viewing. The lighting device 20 is normally used if natural lighting is not enough or if it is obstructed by enclosing walls of the stereoscope apparatus 10.

Referring to FIGS. 5A and 5B, there are shown the same type of stereoscope apparatus but this time they are constructed in multi-tiered form. In FIG. 5A, a 2-tiered unit is constructed to provide the viewer with longer view of the scene or picture upward. In this unit, horizontal or longer type views are used. In FIG. 5B, a 3-unit is shown which allows the use of even a longer views or pictures.

Figure 6:
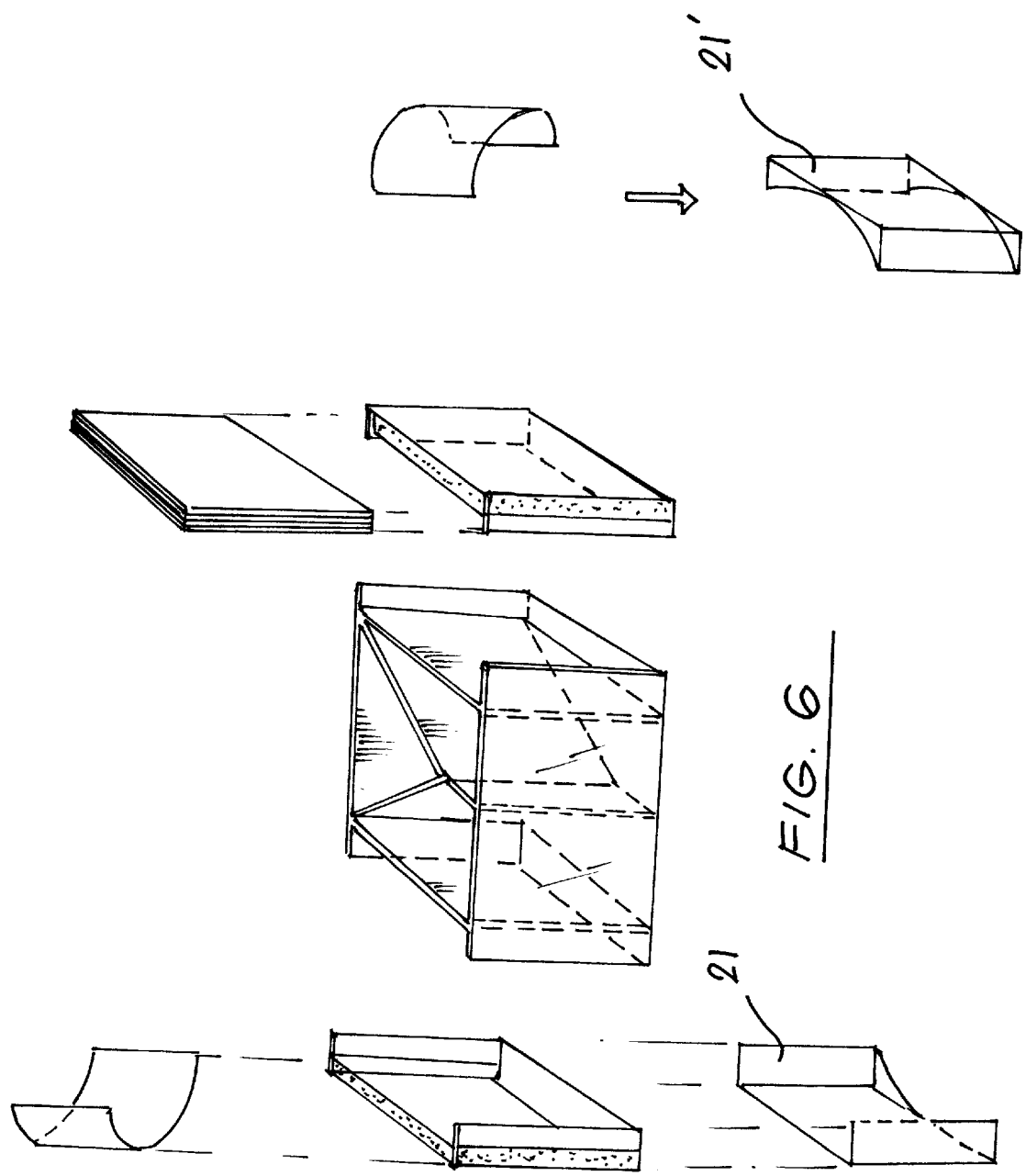
FIG. 6 is a perspective view of the subject invention with attachments to enhance the reflection of the pictures.

With reference to FIG. 6, there is shown the attachments adapted to be used in connection with this stereoscope apparatus. The attachments are in the form of inwardly curve members 21 which bend the picture or views into semi-circle to provide viewer with the sensation of greater penetration into the scene. This also adds emphasis on the peripheral areas, and impart a more eye-ball-like reflection. Form sheets 19 are secured on the backing sheet to provide the needed resiliency.

Shown in FIGS. 7A and 7B are the eyeglass size models of the subject stereoscope apparatus. The first model (FIG. 7A) uses still pictures or images which are placed on the holding means 13 and 13'. The device is basically a M-shape unit with ear attachments 22 and 22'.

The second model is similar to the first except that instead still pictures or images, micro or pocket size televisions 23 are used. Hence, moving pictures are projected on the reflective sheets 11 and 12.

Figure 8B:
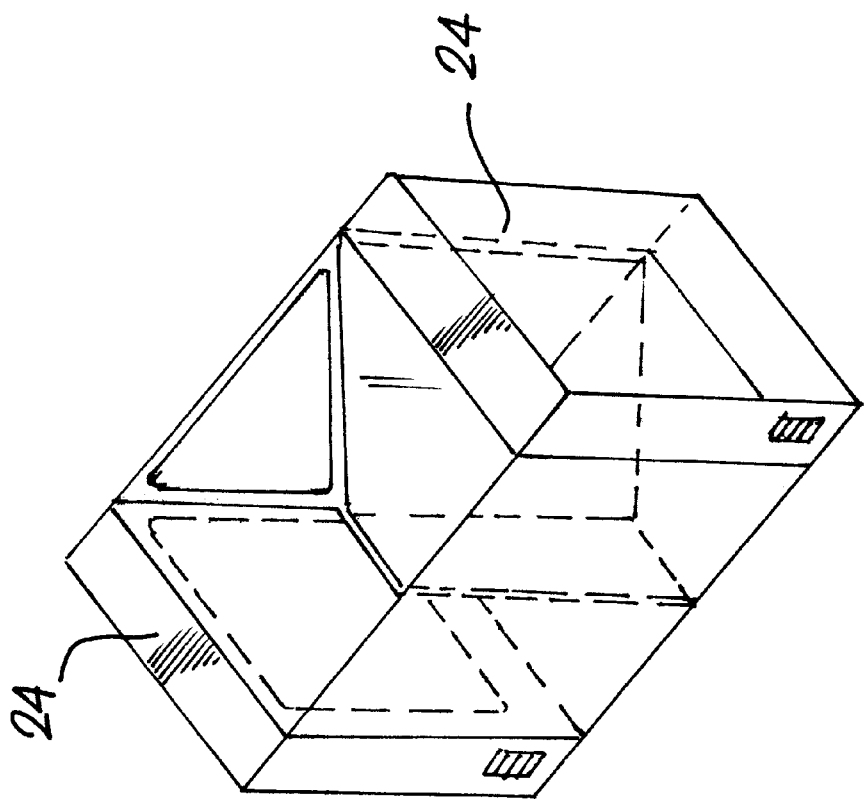
FIG. 8B is an illustration of a hand-held size model with small televisions.
Figure 8A:
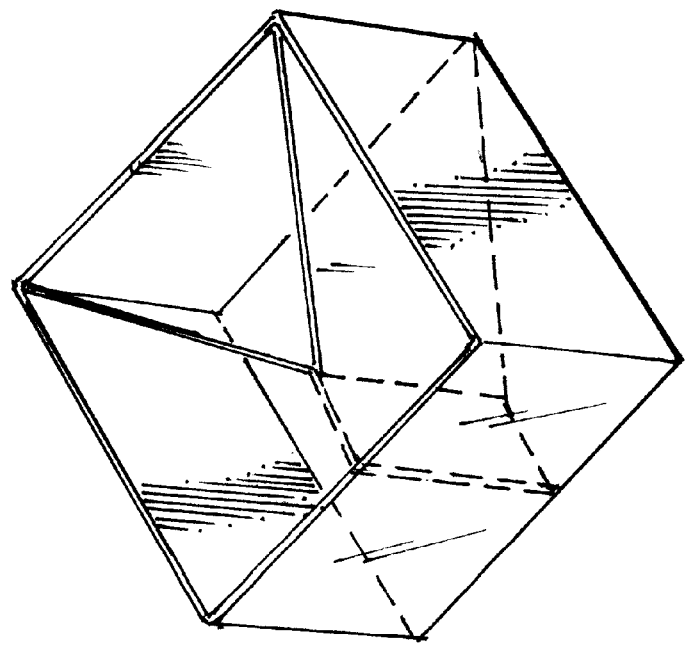
FIG. 8A is an illustration of a hand-held size model.

Another model, the hand-held size model is shown in FIGS. 8A and 8B. The first model is basically the same as the one shown in FIG. 2 except that no left and right compartments are defined. This model is highly portable. The second model is the same as in FIG. 8A except that instead of still pictures or images, small televisions 24 are used thereby moving pictures or images from these television 24 are viewed in 3D.

Figure 9A:
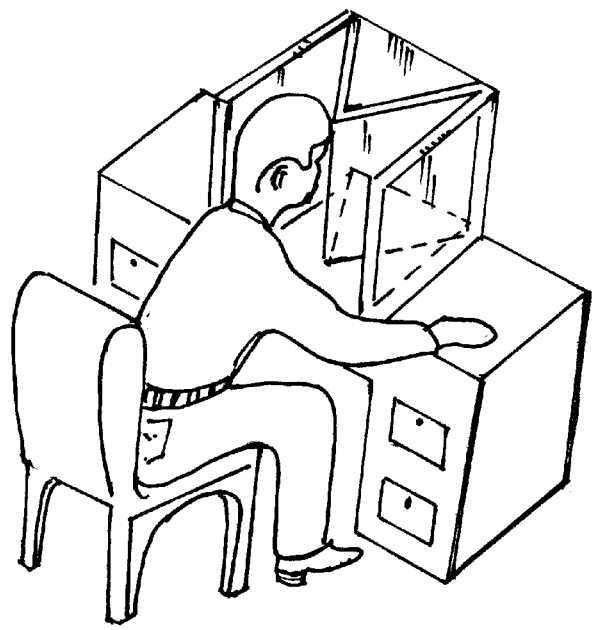
FIG. 9A is an illustration of a table-size model.
Figure 9B:
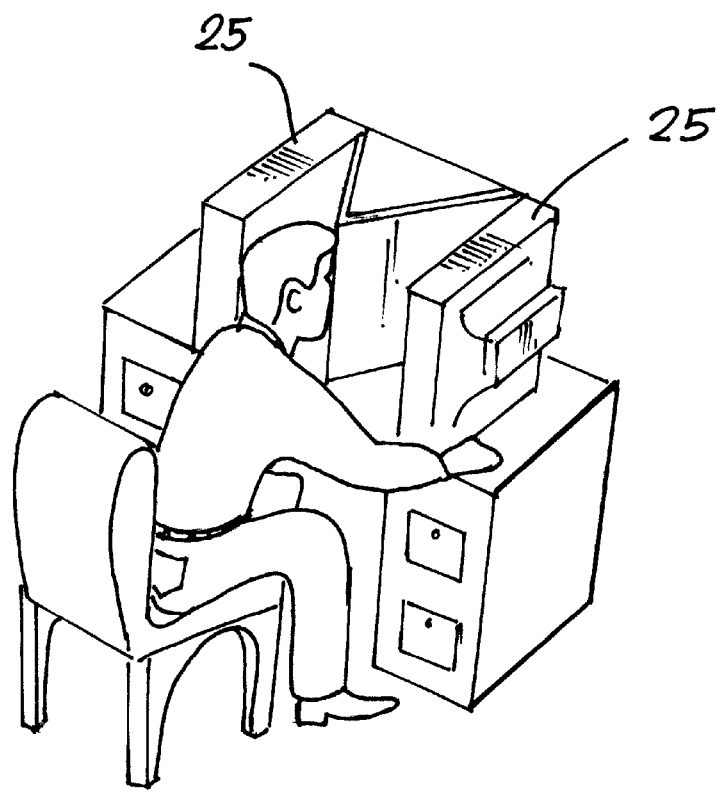
FIG. 9B is an illustration of a table-size model with computers and televisions.

Referring to FIGS. 9A and 9B, there is shown the table size models, the first uses a still picture or images while the second uses small televisions or computers 25. Except for their size, these models of stereoscope apparatus are the same with the other models. With the table-top models, physician or technicians may able to view X-RAY films in 3D.

Figure 10:
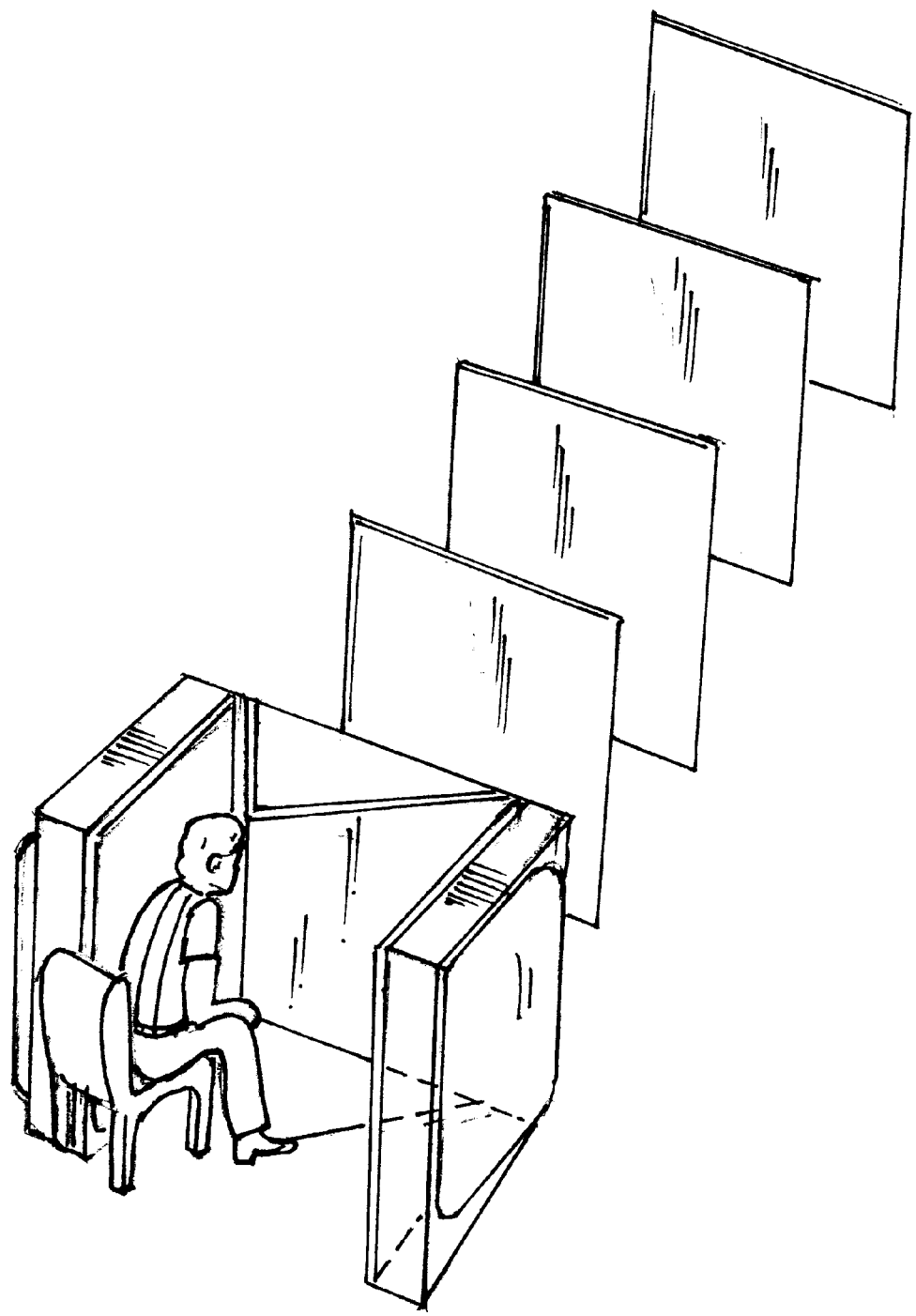
FIG. 10 is an illustration of a giant T.V. screen size model.

With reference to FIG. 10, there is shown a giant T.V. screen model. Except for its size, the basic construction of this stereoscopic apparatus device is the same as in the other models.

Figure 11:
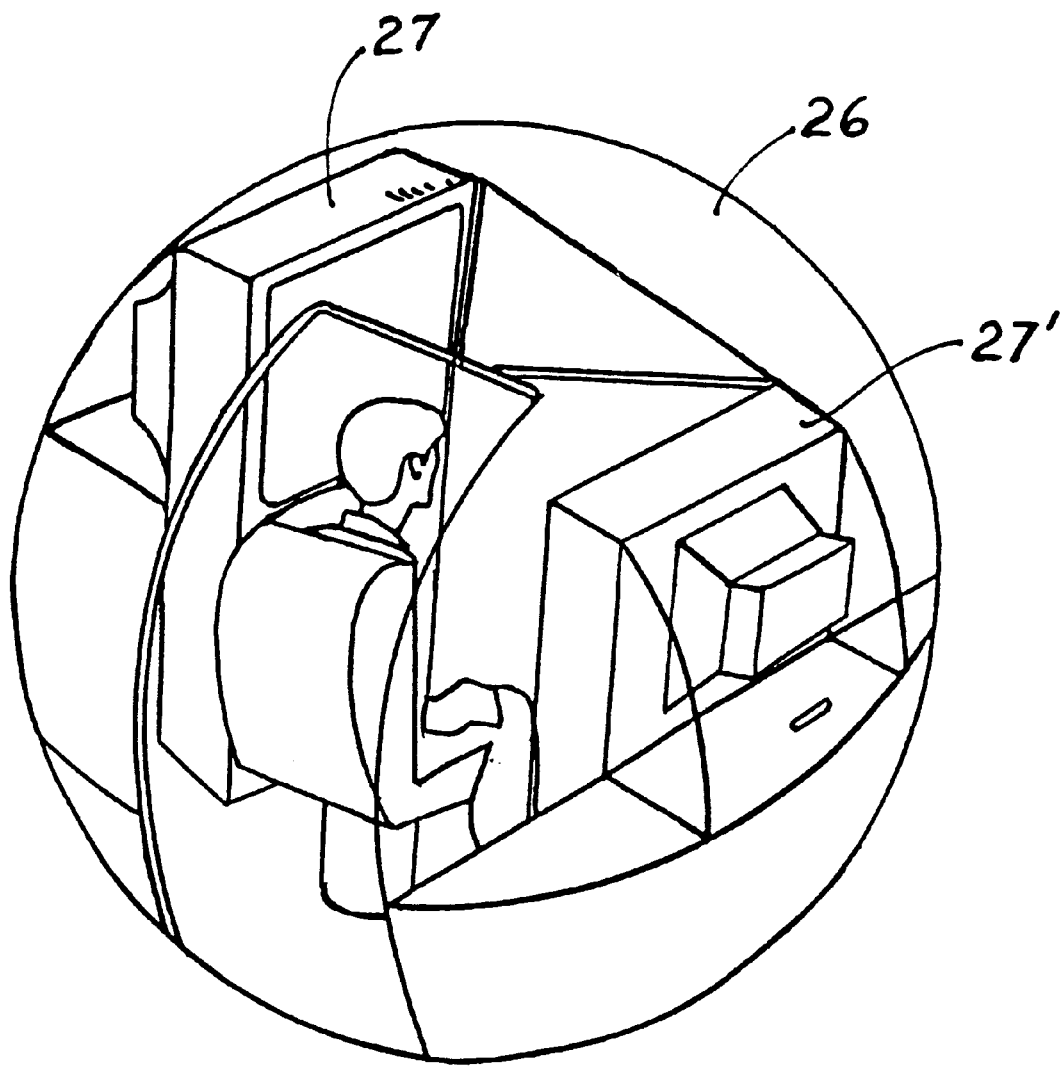
FIG. 11 is a perspective view of another embodiment of this invention enclosed in a spherical housing.

Shown in FIG. 11 is another model known as the spherical model. The spherical enclosure 26 fully encloses this stereoscope apparatus. In this model, the left eye view of a scene is installed on the left hemisphere 27 while the right-eye view of the scene is installed on the right hemisphere 27'. The spherical model provides an even greater emphasis on the peripheral views of a scene.

Figure 12:
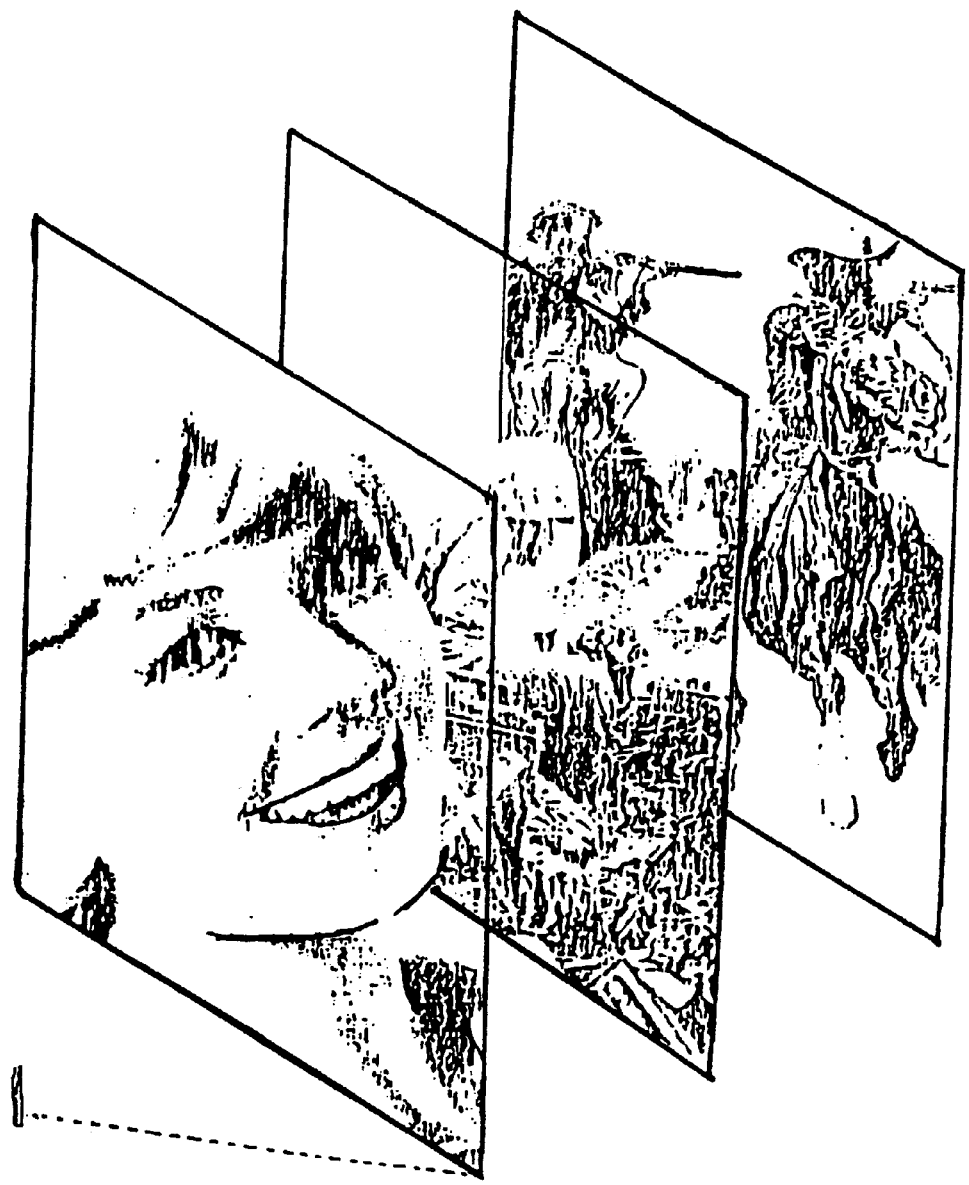
FIG. 12 is an illustration of a theater size model.

Referring to FIG. 12, there is shown the theater size model. Just like the other models, the basic elements and principle of operation are the same except for the size.

When television screens are used in the walls of this stereoscope apparatus, scenes projected on the reflective sheets would be viewed in 3D and in motion. To achieve this, it is required to have the left eye view of a scene projected on the left television screen and the right-eye view of the same scene, on the right television screen. The former could be transmitted to one channel and the latter on to another channel. Both views must be necessarily aired simultaneously from a regular T.V. stations, close-circuit televisions, surveillance monitors or camcorders. The views may also be transmitted live or replayed from tapes, compact discs or VCR's. In the latter, since a pair of each type is required, perfect synchronization in speed and or timing form beginning to end is necessary.

When computer screens or monitors are used for the inner walls of this device, the viewer may achieve a sensation of having lost himself in the scene itself, of being there, of being part of it, of floating in space, of having disappeared physically, of seeing the scene in mind or spirit only.

In the common 3D viewer (Viewmaster) the scene that a person sees does not change in whatever direction he moves his head into. But in real life, the scene that a person sees changes if or when he moves his head. Thus, as a degree of movement of his head to the right, a degree of the scene furthest to his left disappears and or while a degree of the scene furthest to his right appears.

With this present invention using computer screen, this real-life phenomenon can be simulated. All it takes is for a computer programmer to take the following:

1. Divide the whole scene covering everything in front, behind, left, right, above and below him, into points.
2. Correspond or assign each of these points with a particular zone of the whole scene. A zone shall be the maximum area of field of the scene that the eyes of a person can cover at a given time from a certain distance.
3. Make two sets of each zone. One set shall be for the left eye view of the zone and the other set, for the right-eye view of zone.
4. Store all left-eye zones in the memory of the left computer and all right-eye view zones in the memory of the right computer.
5. To bring on to the computer screen zone, the viewer needs only to access the point to which the said zone was assigned previously. Then with such views of each zone accessed and projected simultaneously on the respective computer screens, the zone shall be seen in three-dimension.
6. From this zone, viewer may just change scene by accessing the next and adjacent point in any direction he may choose. A joy-stick like control device is provided for such purpose. The control device acts as or represents the viewer's head. Each degree of movement of the control device shall automatically switch on the left and right-eye views of the a zone of the scene on the computer screens. As in travelling by car, one can locate his exact position in space at a given time on a road map. From that point, he can proceed driving on to the next and adjacent point in any direction he may choose. Viewer may access on to the computer screens only the next and adjacent point in order to move the scene gradually and smoothly from one zone to the next and adjacent zone.

The holding means for both embodiments are any device which can hold or retain a picture or images. In this particular example, the holding means is in the form of walls capable of retaining in upright position pictures or images.

The preferred included angle between the reflective sheets 11 and 12 is 45 degrees but this may deviate from ±5 degrees or may have a range of 40 to 50 degrees. The same range is true from the angles between the reflective sheets 11 and 12 and the holding means 13 and 13'.

I claim:

1. An improved stereoscope apparatus comprising:
   a. at least two (2) reflective sheets namely the left and the right reflective sheets converging at a predetermined angle in upright position toward the line of sight of the viewer such that the left eye sees only the left reflective sheet and right eye sees only right reflective sheet;
   b. a pair of holding means for pictures or images disposed at a predetermined angle relative to the reflective sheets whereby the pictures or images held therein namely, the left eye view and the right eye view of a particular picture or image, are reflected on the respective reflective sheets thereby imparting a three (3) dimensional effect on the eyes as the viewer;
   c. an enclosing wall positioned at the back, sides and front of the device forming a box-type structure thereby confining the reflective sheets and the holding means whereby the front wall is transparent to enable viewing from the outside; and
   d. a pair of compartments defined on the sides of the holding means to contain a plurality of left eye view and right eye view pictures intended to be viewed.

2. An improved stereoscopic apparatus as in claim 1 wherein viewing lenses are installed on the front wall.

3. An improved stereoscopic apparatus as in claim 1 wherein a top wall is provided on the box, and a lighting device is installed within the box.

4. An improved stereoscopic apparatus as in claim 1 wherein additional similar box without viewing lenses are assembled together with the basic box to provide the viewer a longer view of the scene upward.

5. An improved stereoscopic device as in claim 3 wherein a divider wall extends from the converging point of the two reflective sheets.

6. An improved stereoscopic device as in claim 5 wherein wall attachments are set between holding means and reflective sheets one ach side of the device to enhance the 3D effect of viewing installed picture.

7. An improved stereoscopic device as in claim 1 wherein the holding means are sheet material formed into walls.

8. An improved stereoscopic device as in claim 1 wherein the reflective sheets are mirrors.

9. An improved stereoscopic device as in claim 1 wherein electrically produced images by projector, televisions and monitors are used instead of pictures.

10. An improved stereoscopic device as in claim 1 wherein the included angle between the reflected sheets varies from 40 to 50 degrees.

11. An improved stereoscopic device as in claim 1 wherein the included angle between the reflected sheets and the holding means varies from 40 to 50 degrees.

12. An improved stereoscopic device as in claim 1 wherein the pictures reflected thereon are moving pictures or images.

13. An improved stereoscopic device as in claim 1 wherein televisions or computers are used in projecting the pictures or images to the reflective surfaces.

14. An improved stereoscopic device as in claim 1 wherein the reflective sheets are convex or concave.

* * * * *